United States Patent
Prodoehl et al.

(10) Patent No.: US 12,301,459 B2
(45) Date of Patent: *May 13, 2025

(54) OPTIMAL INTERNET PATHWAY SELECTION

(71) Applicant: Connectify, Inc., Philadelphia, PA (US)

(72) Inventors: Brian Prodoehl, Plymouth Meeting, PA (US); Kevin Cunningham, Swarthmore, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,594

(22) Filed: Dec. 6, 2023

(65) Prior Publication Data

US 2024/0106752 A1 Mar. 28, 2024

Related U.S. Application Data

(63) Continuation of application No. 17/971,131, filed on Oct. 21, 2022, now Pat. No. 11,876,712, which is a continuation of application No. 17/344,594, filed on Jun. 10, 2021, now Pat. No. 11,516,132.

(60) Provisional application No. 63/037,684, filed on Jun. 11, 2020.

(51) Int. Cl.
*H04L 45/74* (2022.01)
*H04L 12/46* (2006.01)

(52) U.S. Cl.
CPC .......... *H04L 45/74* (2013.01); *H04L 12/4633* (2013.01); *H04L 12/4641* (2013.01); *H04L 2212/00* (2013.01)

(58) Field of Classification Search
None
See application file for complete search history.

(56) References Cited

U.S. PATENT DOCUMENTS

2006/0215579 A1 9/2006 Nadeau et al.
2020/0336409 A1* 10/2020 Branch ............... H04L 63/0272
2021/0067592 A1* 3/2021 Warnicke ............ H04L 41/5009

* cited by examiner

*Primary Examiner* — Christine T Duong
(74) *Attorney, Agent, or Firm* — Kamran Emdadi

(57) ABSTRACT

An example method may include receiving upload packets, at an interconnect server center (ISC) device from a virtual private network (VPN) client device, and the upload packets may include a header identifying the (ISC) device and a destination server as destination fields, transmitting, via the ISC device, tests packets along a plurality of different Internet pathways to identify network characteristics of the Internet pathways, determining an amount of time until one or more responses to the test packets are received, and forwarding the upload packets to a VPN server for routing to the destination server via an Internet pathway selected based on the amount of time associated with the received test packets.

20 Claims, 9 Drawing Sheets

|  | SOURCE | DESTINATION | SOURCE | DESTINATION | PAYLOAD |
|---|---|---|---|---|---|
|  | CLIENT DEVICE 110 | CLIENT 110 606 | SERVER 160 604 | PAYPLOAD 1 602 |
| VPN CLIENT 118 | CLIENT 110 614 | ISC 210 610 | CLIENT 110 606 | SERVER 160 604 | PAYPLOAD 1 602 |
| ISC 210 | ISC 210 616 | VPN 170 612 | CLIENT 110 606 | SERVER 160 604 | PAYPLOAD 1 602 |
|  | VPN 170 | VPN 170 608 | SERVER 160 604 | PAYPLOAD 1 602 |

FIG. 6A

|  | SOURCE | DESTINATION | SOURCE | DESTINATION | PAYLOAD |
|---|---|---|---|---|---|
|  | SERVER 160 | SERVER 160 632 | VPN 170 624 | PAYPLOAD 2 622 |
| VPN 170 | VPN 170 638 | ISC 210 634 | SERVER 160 632 | CLIENT 110 OR VPN 170 626 | PAYPLOAD 2 622 |
| ISC 210 | ISC 210 640 | CLIENT 110 636 | SERVER 160 632 | CLIENT 110 OR VPN 170 626 | PAYPLOAD 2 622 |
|  | VPN CLIENT 118 | SERVER 160 632 | CLIENT 110 628 | PAYPLOAD 2 622 |

FIG. 6B

| | SOURCE | DESTINATION | SOURCE | DESTINATION | PAYLOAD |
|---|---|---|---|---|---|
| VPN CLIENT 118 | | CLIENT DEVICE 110 | CLIENT 110 706 | SERVER 160 704 | PAYPLOAD 3 702 |
| | CLIENT 110 712 | VPN 170 710 | CLIENT 110 706 | SERVER 160 704 | PAYPLOAD 3 702 |
| | | VPN 170 | ISC 210 708 | SERVER 160 704 | PAYPLOAD 3 702 |

FIG. 7A

| | SOURCE | DESTINATION | SOURCE | DESTINATION | PAYLOAD |
|---|---|---|---|---|---|
| ISC 210 | | SERVER 160 | SERVER 160 732 | ISC 210 724 | PAYPLOAD 4 722 |
| | ISC 210 736 | VPN 170 734 | SERVER 160 732 | ISC 210 OR CLIENT 110 726 | PAYPLOAD 4 722 |
| | | VPN 170 | SERVER 160 732 | CLIENT 110 728 | PAYPLOAD 4 722 |

FIG. 7B

OPTIMAL INTERNET PATHWAY SELECTION

FIELD OF THE INVENTION

The present invention relates to communications pathway selection and more particularly to pathway selection over the Internet. Specifically, a process for providing at least partial control of Internet pathway selection in combination with a virtual private network (VPN).

BACKGROUND

FIG. 1 illustrates operation 100 of a virtual private network (VPN) server in accordance with the prior art. Data from an application(s) 112 running on client device 110 is transmitted to Internet 140 via Internet service provider (ISP) 130 and optionally via local area network (LAN) 120 depending on the configuration of the network. When a VPN server 170 is in use, the data from client 110 is encapsulated along with the source IP address of client 110 and the destination IP address. When the encapsulated data is transmitted to Internet 140, the data is transmitted along with the IP address of VPN server 170 as part of the encapsulation process. VPN server 170 receives and decapsulates the data and sends the data to its destination, for example server 150 or 160. The data that is sent to server 150 may indicate that the source of the data is VPN server 170.

On the return trip, the data from server 150 is returned to VPN server 170. VPN server 170 includes a lookup table in which VPN server 170 stores the IP address of client 110 that initially communicated with server 150. By identifying the response from server 150, VPN server 170 encapsulates the data from server 150 and transmits the data to client 110. Once decapsulated by client 110, client 110 can see that the return data came from server 150. The client 110 may have a VPN client 118 operating as an agent application which may process packet data via modules 114/116.

Client 110, VPN server 170, and server 150 all have the ability to identify source and destination (endpoints and/or midpoints) of data packets. Such control is maintained by storing various source and destination IP addresses in packet headers (with or without encapsulation). Furthermore, data packets can be temporarily redirected by encapsulating those packets and providing intermediate source and/or destination IP addresses in added headers.

While clients and servers can participate in identifying source, destination, and/or intermediate locations for packet transmissions, IP addresses are simply numerical labels that are assigned to each device connected to a computer network that uses the Internet Protocol for communication. As packets of data are exchanged between source and destination, neither the client 110 nor the remote server 150/160 typically has any control regarding the physical pathways over which the data flows (other than, for example, choice of ISP). Choosing the actual pathway over which data flows between client 110 and server 150/160 may be decided by the ISP 130. For example, the ISP 130 may have various IP transit or IP pairing arrangements which might play a role in how data is transmitted over the Internet 140. Thus, Internet pathway selection by the ISP 130 might be influenced by a cost analysis. Without any control over how data flows over the Internet 140, client 110 may be communicating with VPN server 170 (and/or VPN server 170 may be communicating with server 150) using a sub optimal connection pathway. This may be undesirable when client 110 desires to communicate with VPN server 170 (and VPN server 170 wishes to communicate with server 150) as quickly as possible.

SUMMARY OF THE INVENTION

Example embodiments may include a method of routing upload packets between a client and a remote server, the method may include forwarding upload packets from the client to an interconnect server center by providing an IP address of the interconnect server center (ISC), receiving at the interconnect server center, via an ISP, the upload packets from the client, the plurality of upload packets are destined for the remote server, permitting the interconnect server center to select from among a plurality of pathways within the Internet for transmitting the upload packets towards a VPN server, transmitting the upload packets from the ISC to the VPN server along a selected one of the pathways, transmitting the upload packets from the VPN server to the remote server, wherein the VPN server hides from the remote server that the upload packets originated from the client.

Another example embodiment may include a method that includes identifying upload packets at a VPN client operating on a client device, wherein the upload packets include a header comprising a destination server as the destination field and the client device as the source field, adding, via the VPN client, an additional header identifying the client device in an additional source field and identifying an interconnect server center (ISC) device in an additional destination field, to create modified upload packets, receiving the modified upload packets from the client device at the ISC device, replacing, via the ISC device, the additional source field of the modified upload packets with a new additional source field identifying the ISC device and replacing the additional destination field of the modified upload packets with a new additional destination field identifying a VPN server to create further modified upload packets, and forwarding the further modified upload packets to the VPN server for routing to the destination server.

Still yet another example embodiment may include a system that includes a client device configured to identify upload packets at a VPN client operating on the client device, wherein the upload packets include a header comprising a destination server as the destination field and the client device as the source field, add, via the VPN client, an additional header identifying the client device in an additional source field and identifying an interconnect server center (ISC) device in an additional destination field, to create modified upload packets, wherein the ISC is configured to receive the modified upload packets from the client device at the ISC device, replace the additional source field of the modified upload packets with a new additional source field identifying the ISC device and replacing the additional destination field of the modified upload packets with a new additional destination field identifying a VPN server to create further modified upload packets, and forward the further modified upload packets to the VPN server for routing to the destination server.

Yet still further another example embodiment may include a non-transitory computer readable storage medium configured to store instructions that when executed cause a processor to perform identifying upload packets at a VPN client operating on a client device, wherein the upload packets include a header comprising a destination server as the destination field and the client device as the source field, adding, via the VPN client, an additional header identifying the client device in an additional source field and identifying an interconnect server center (ISC) device in an additional destination field, to create modified upload packets, receiving the modified upload packets from the client device at the ISC device, replacing, via the ISC device, the additional source field of the modified upload packets with a new additional source field identifying the ISC device and replacing the additional destination field of the modified upload packets with a new additional destination field identifying a VPN server to create further modified upload packets, and forwarding the further modified upload packets to the VPN server for routing to the destination server.

Yet another example embodiment may include a method that includes identifying upload packets at a VPN client operating on a client device, and the upload packets include a header with a destination server as the destination field and the client device as the source field, adding, via the VPN client, an additional header identifying the client device in an additional source field and identifying an interconnect server center (ISC) device in an additional destination field, to create modified upload packets, receiving the modified upload packets from the client device at the ISC device, replacing, via the ISC device, the additional source field of the modified upload packets with a new additional source field identifying the ISC device and replacing the additional destination field of the modified upload packets with a new additional destination field identifying a VPN server to create further modified upload packets, and forwarding the further modified upload packets to the VPN server for routing to the destination server.

Another example embodiment may include a method including receiving upload packets, at an interconnect server center (ISC) device from a virtual private network (VPN) client device, and the upload packets may include a header identifying the (ISC) device and a destination server as destination fields, transmitting, via the ISC device, tests packets along a plurality of different Internet pathways to identify network characteristics of the Internet pathways, determining an amount of time until one or more responses to the test packets are received, and forwarding the upload packets to a VPN server for routing to the destination server via an Internet pathway selected based on the amount of time associated with the received test packets.

DESCRIPTION OF THE DRAWINGS

FIGS. 6A and 6B illustrate the use of exemplary headers in accordance with exemplary embodiments of the present invention.

FIGS. 7A and 7B illustrate another example of the use of exemplary headers in accordance with exemplary embodiments of the present invention.

DETAILED DESCRIPTION

Figure 1:
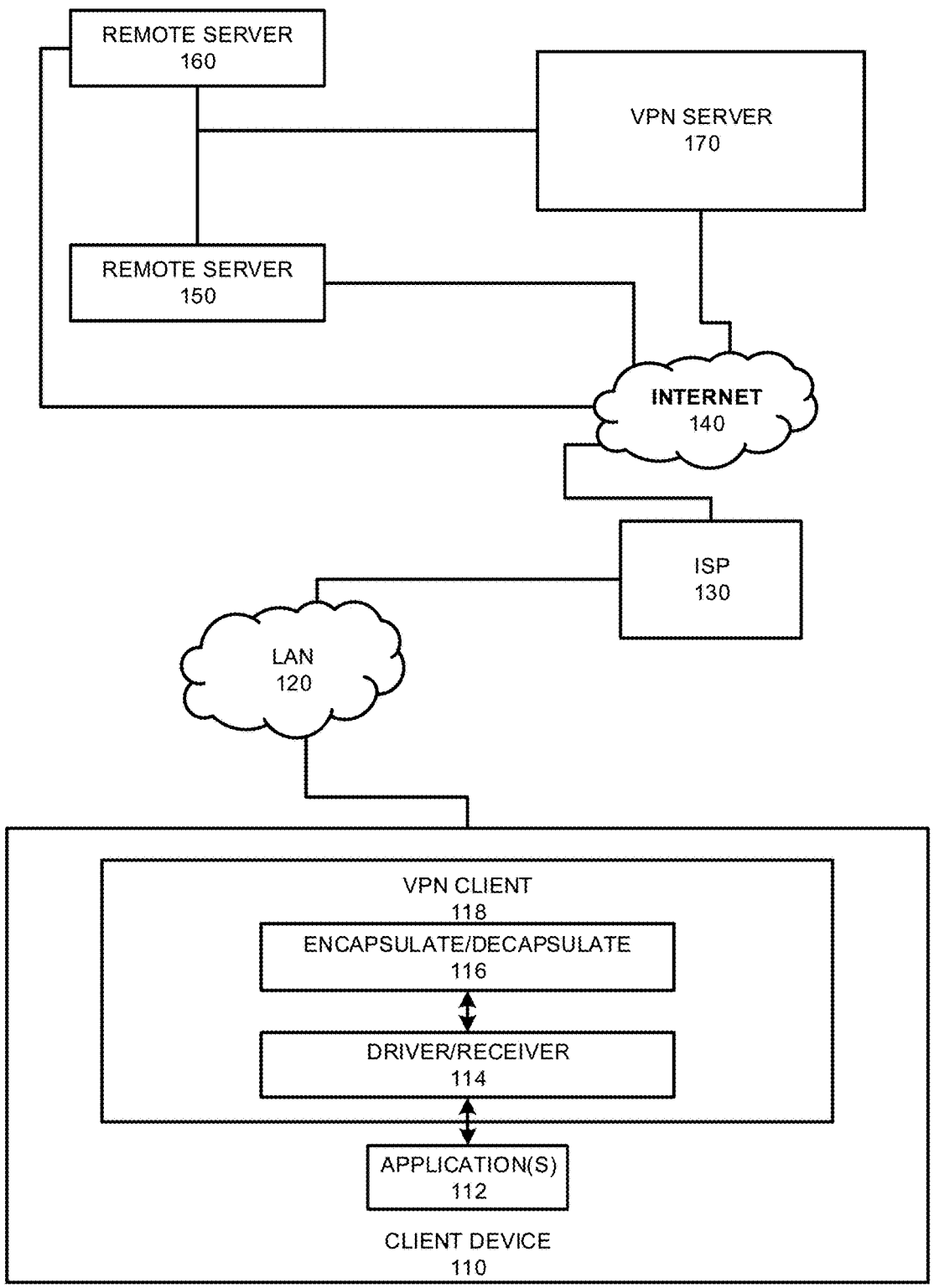
FIG. 1 is a block diagram that illustrates communication between a client, a remote server, and a VPN server in accordance with the prior art.
Figure 2:
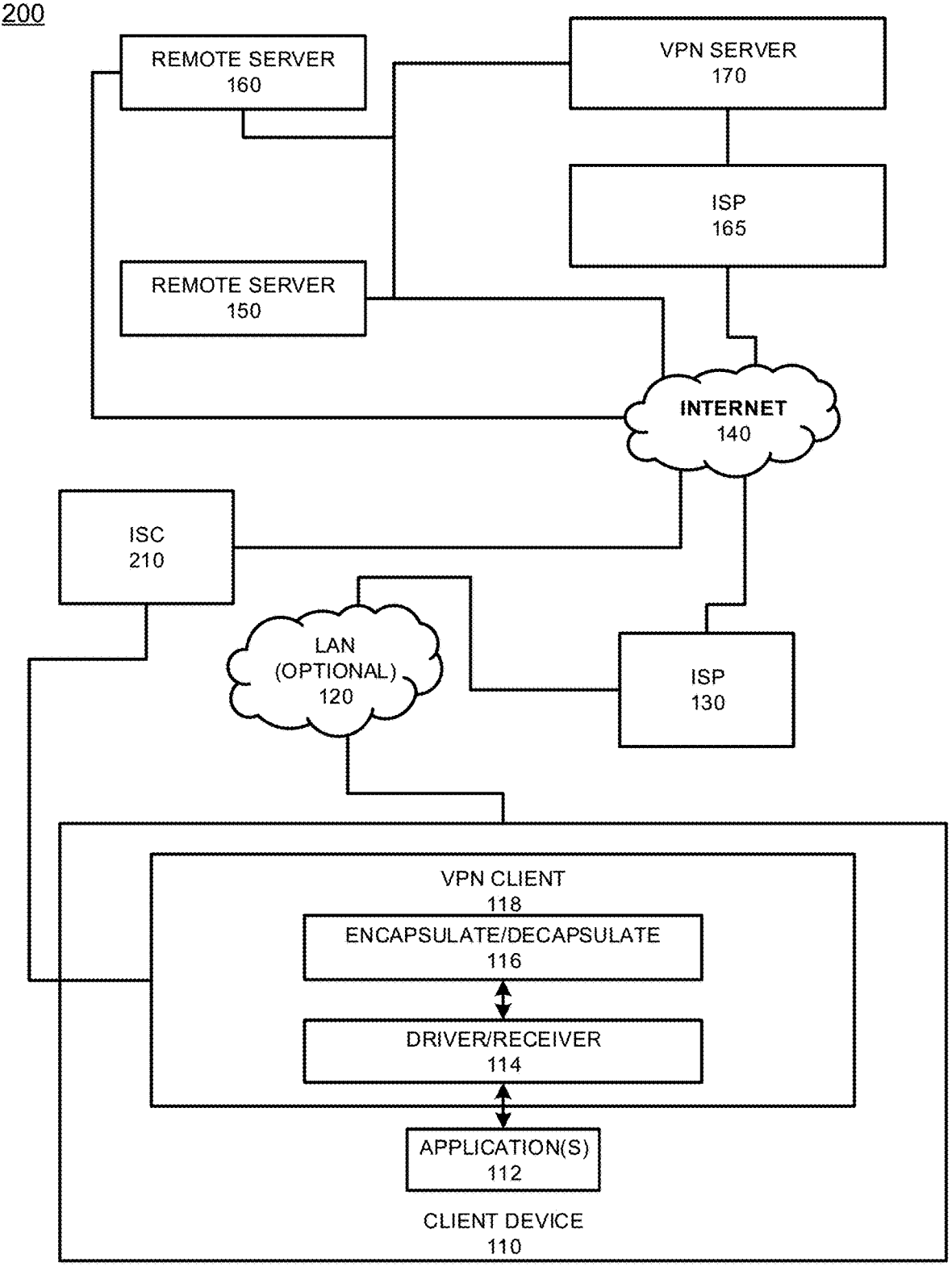
FIG. 2 is a block diagram that illustrates communication between a client, a remote server, a VPN and an interconnect server center (ISC) in accordance with an exemplary embodiment of the present invention.

FIG. 2 is a block diagram 200 that illustrates client 110 communicating with server 150 and/or server 160 in accordance with one or more exemplary embodiments of the present invention. Client 110 wishes to communicate with server 150 and/or server 160 and typically is expecting a response in return. For purposes of illustration, an explanation will now be provided regarding client 110 and server 150 communicating outside of a VPN. In addition, for purposes of illustration, an explanation will now be provided regarding client 110 and server 160 communicating within a VPN server 170.

In a first example, client 110 communicates with server 150 outside of the VPN 170. For purposes of this explanation, it is assumed that DNS resolution of a domain name (if needed) has already occurred. Client 110 then sends packets of data to ISP 130. Typically, ISP 130 is reached through an optional local area network 120. The transmitted packets traverse Internet 140 with an insertion path decided by ISP 130. As the destination address of the packets is server 150, the packets travel from Internet 140 to server 150. Server 150 receives the packets and then transmits a response to the IP address included in the source field of the packets received by server 150. In this example, the packets thus travel from server 150 to Internet 140 (through an ISP, not illustrated), and exit Internet 140 when those packets are delivered to ISP 130. The packets are then delivered to client 110 via optional local area network 120.

In the scenario described above, client 110 and server 150 typically have no control over the pathway within Internet 140 that is used for packet transmission. An ISP delivers packets to Internet 140 based on how the ISP is physically and/or logically connected to Internet 140 and/or decisions that the ISP makes regarding at least part of the packets' route within Internet 140. For example, if the ISP has multiple connections to Internet 140, the ISP can decide over which of those connections to transmit packets to Internet 140. Furthermore, ISP 130 may be a Tier 3 network, a Tier 2 network, or a Tier 1 network. These details regarding each ISP will affect how data is delivered to Internet 140. Furthermore, each ISP may have IP transit or IP peering arrangements with other ISPs. Thus, when an ISP delivers data to the Internet, how the data is delivered or transmitted to the Internet may be affected by those IP transit and/or IP peering arrangements.

One way to control how data at least partially flows over the Internet 140 is through the use of an interconnect server center (ISC) 210. An inner connect server center 210 may include multiple connections to the Internet 140. Thus, the interconnect server center 210 is able to assert some control regarding how packets of data flow over the Internet.

An interconnect server center offers various options. For example, an interconnect server center may offer accessibility to one or more Tier 2 networks that connect into one or more Internet backbone networks. In another example, an interconnect server center can offer accessibility to one or more Tier 3 networks. These networks may connect to one or more Tier 2 networks, which again connect to one or more Internet backbone networks. In yet another example, an interconnect server center can offer accessibility to one or more Tier 1 networks.

ISC 210 includes one or more network routers. Each network router includes a routing table to determine how data should be transmitted to (and through) the Internet 140. When a request is received by a network router, the network router's routing table is checked to determine a path (or partial path) to the destination. In one example, a network router may look on its own network to determine if the destination can be reached (or approached) based on its own target information. Some network routers have the ability to connect to other routers and to search a "full routing table" using information obtained from a border gateway protocol (BGP). In one example, pathway selection to (and/or through) the Internet 140 may be through a direct peering relationship. In one example, pathway selection to (and/or through) the Internet may be through an IP transit relationship. Alternatively, pathway selection to (and/or through) the Internet may be by access to a Tier 1 network, a Tier 2 network, and/or a Tier 3 network and which may include a combination thereof.

Tier 1 network providers have global reach. These providers peer with each other and act as global conduits to all networks. Thus, Tier 1 providers form the backbone of the Internet. These Tier 1 providers are also referred to as Tier 1 network providers, Tier 1 networks, or Tier 1 ISPs, and they provide Tier 1 networks. Tier 1 networks are designed with one hop latency. These providers peer with each other, but they charge lower tiers a fee in order to access their network. The reach of Tier 1 providers permits for routing tables that can route a request to anywhere on the Internet. Examples of Tier 1 providers include AT&T, CenturyLink, and Level 3.

Tier 2 providers (or networks or ISPs) are characterized by multiple physical locations in data centers, and large networks. Tier 2 ISPs typically peer with each other in order to extend the breadth of their content delivery capacity. These providers also peer with each other in order to attempt to avoid the usage costs associated with accessing Tier 1 networks. Examples of Tier 2 ISPs include Comcast, British Telecom, and Vodafone.

Tier 3 providers (or networks or ISPs) are typically local providers with smaller client lists. Tier 3 providers often purchase a portion of IP transit to Tier 2 providers in order to avoid the costs of accessing a Tier 1 ISP directly.

In an exemplary embodiment of the present invention, when ISC 210 directs data to or along the Internet 140, the ISC 210 has various information and statistics which it may use to decide how data will enter (and/or flow-through) the Internet 140. In one example, data may be routed so that the number of hops is minimized. This will result in the time with which data flows from source to destination being reduced.

In another embodiment, the ISC 210 sends test packets along different Internet pathways, and monitors the amount of time until a response is received in order to measure latency. In this manner, the ISC 210 gathers statistics regarding different Internet pathways, and can transmit data along a specific Internet pathway based on that pathway having desirable statistics (e.g., latency).

One method of reducing the number of hops may be to access a certain (or any) Tier 1 network. Alternatively, in some situations, a higher tier ISP may not necessarily be able to provide the most direct route to the destination. For example, while Tier 1 ISPs have expansive reach, their size may cause inefficiency in the number of hops needed to fulfill a request. A Tier 2 provider may be able to provide a more direct path because of direct peering relationships and a more concentrated network footprint. In a further example, different Tier 1 networks may have different levels of congestion. Alternatively, a Tier 1 network may be experiencing technical difficulties. Thus, multiple decisions, multiple criteria, and multiple statistics may be relied upon to route data to and/or through the Internet with the fastest possible speed.

One Tier 2 network may have different approaches for routing data through the Internet compared to another Tier 2 network. For example, a client's ISP may make decisions regarding routing data to the Internet, and the client will have neither input nor control over how those routing decisions will be made. For example, those routing decisions may be made to minimize cost for the ISP. A Tier 2 network that is not the client's ISP (and/or available to the client's ISP) may make routing decisions that provide the client with better performance than the decisions that are made by the client's ISP. Thus, if the client instructs its ISP to forward data to the ISC 210, then the ISC 210 may be able to transmit the data to its destination faster than if the client's ISP was independently permitted to route the data to its destination.

Thus, in one exemplary embodiment of the present invention, client 110 transmits data to interconnect server center (ISC) 210 so that ISC 210 plays a role regarding how the data enters the Internet 140 and/or which path the data flows through the Internet. By saying "plays a role" what is meant is that ISC 210 at least partially selects the path of the data through Internet 140 and/or how the data enters Internet 140. This path or partial path may be selected based on how the data is routed to the Internet 140. This path may be based on the Tier 1 network that ISC 210 uses to transfer data along the Internet. This path may be based on a Tier 2 network that ISC 210 uses to transfer data along the Internet. This path may be based on whether ISC 210 uses a Tier 1 network or Tier 2 network to transfer data along the Internet 140. This path may be based on the "hop" that the data reaches in Internet 140 after departing from ISC 210.

Returning to FIG. 2, client 110 transmits data to ISP 130 via optional local area network 120 (domain name resolution is omitted from this description). The data may travel from ISP 130 to ISC 210 via Internet 140. Alternatively, in some embodiments, client 110 or ISP 130 may have access to ISC 210 over a route that does not include the Internet. Alternatively, in some embodiments, ISC 210 is serviced by the same ISP that services client 110. Alternatively, in some embodiments, ISC 210 is serviced by the same ISP that services VPN server 170.

In some exemplary embodiments, ISC 210 determines a path over the Internet 140 by which data will reach VPN server 170. The data leaves ISC 210 and enters Internet 140 and/or travels through Internet 140 through a pathway at least partially selected by ISC 210. The data then reaches VPN server 170 via its respective ISP 165. VPN server 170 decapsulates the data and transmits the data to server 160 via ISP 160 and Internet 140.

In some exemplary embodiments, ISC 210 (or a different ISC) receives data from the VPN server as the data travels from VPN server 170 to server 160. Thus ISC 210 (or a different ISC) determines at least part of the path over Internet 140 by which data travels from VPN server 170 to server 160.

After server 160 receives data from client 110, server 160 responds by transmitting data to client 110. In one exemplary embodiment, server 160 is serviced by an ISP (not illustrated) that controls how the transmission from server 160 to VPN server 170 is channeled over Internet 140. In another exemplary embodiment, data from server 160 is channeled to ISC 210 (or another ISC) which at least partially controls the pathway over which data travels over Internet 140. Data then travels from Internet 140 and through ISP 165 to VPN server 170. VPN server 170 then transmits the data to client 110 over Internet 140. In some exemplary embodiments, the data travels from VPN server 170 and ISP 165 and then ISP 165 selects at least part of the pathway over which data flows over Internet 140. In some exemplary embodiments, the data is transmitted from VPN server 170 to ISC 210 (or another ISC) which determines at least part of the path over Internet 140 over which data from VPN server 170 travels. After data departs Internet 140, the data is received by client 110 via ISP 130 and optional local area network 120.

Figure 3:
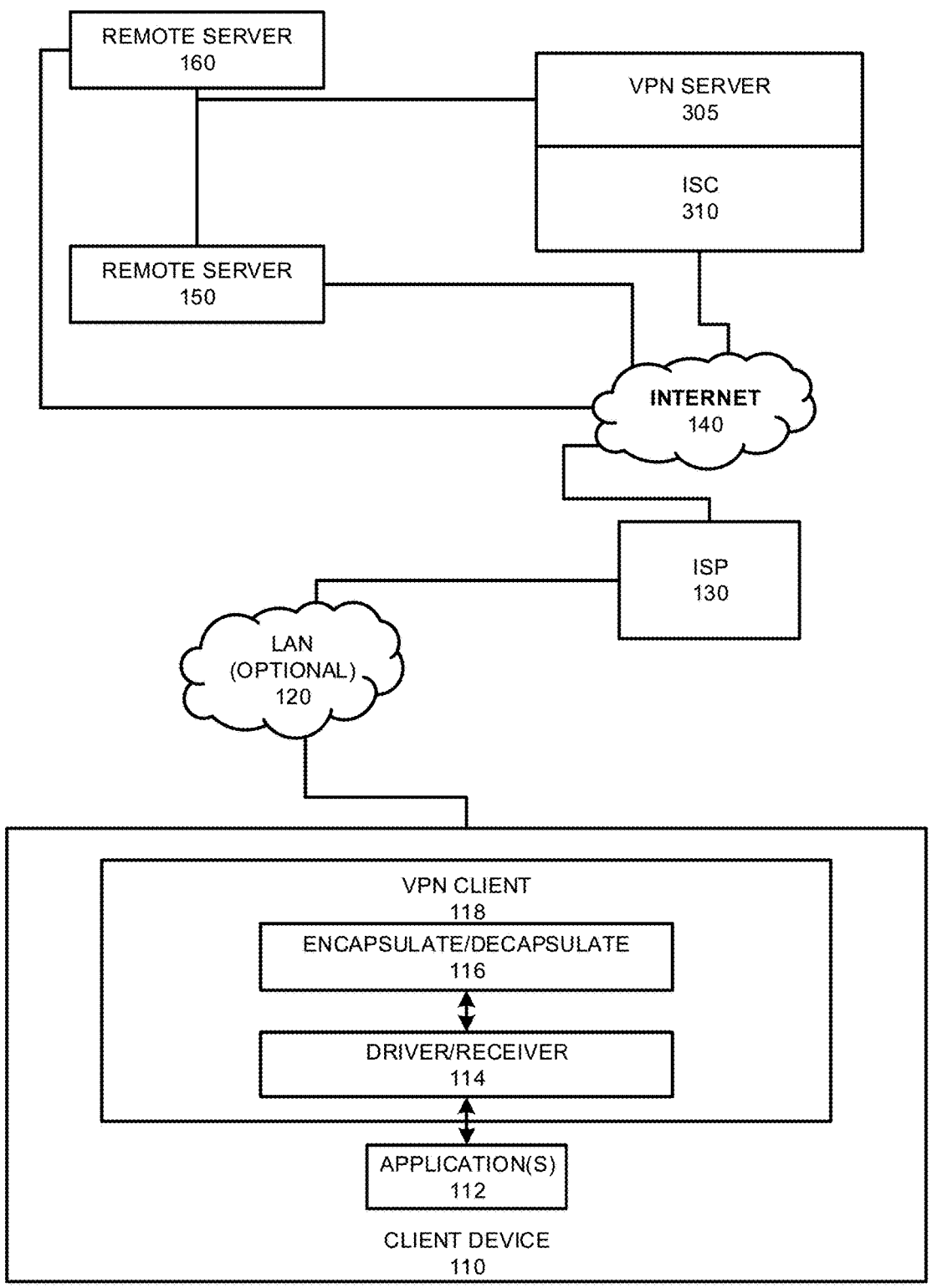
FIG. 3 is a block diagram that illustrates communication between a client, a remote server, and a combined VPN and an ISC in accordance with an exemplary embodiment of the present invention.
Figure 4:
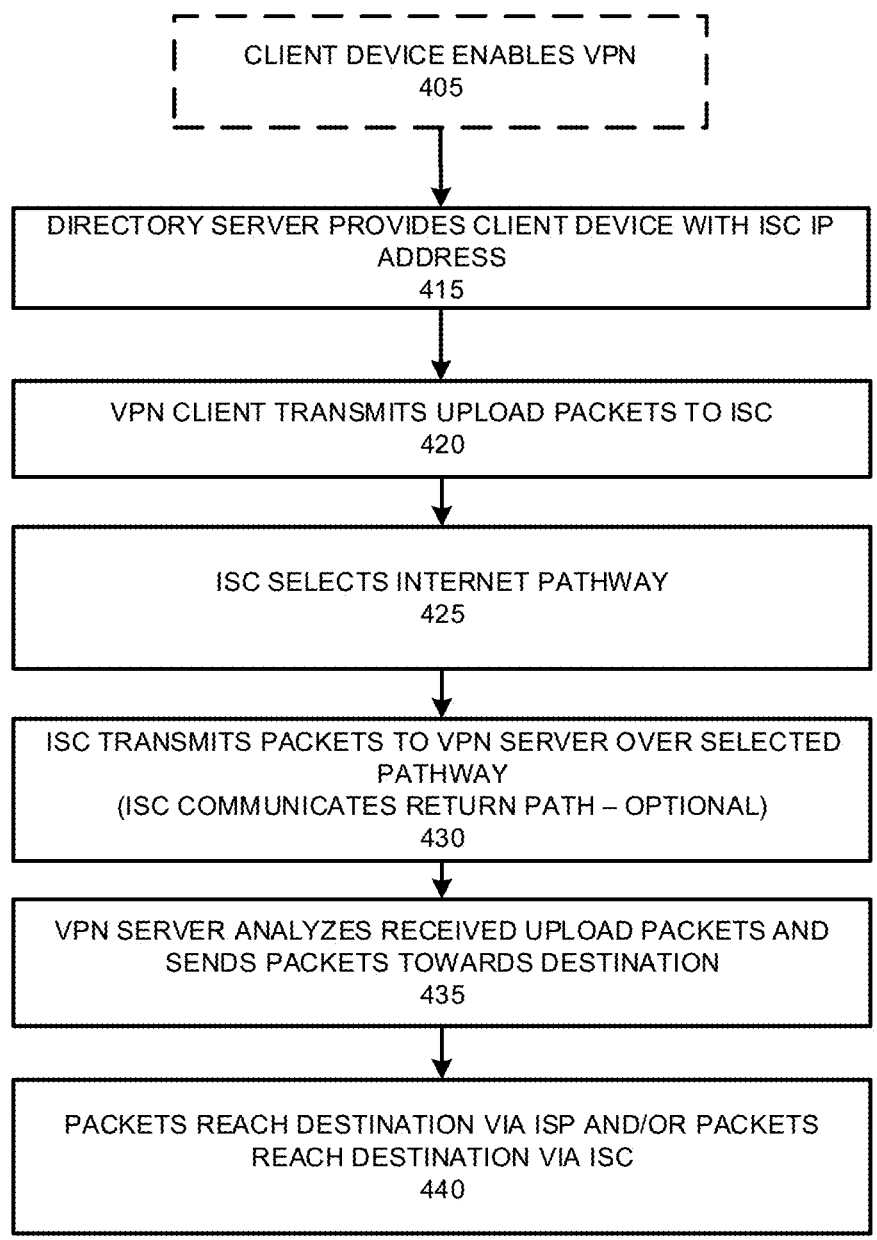
FIG. 4 is a flow chart diagram that illustrates a client communicating with a VPN server and a remote server via an ISC in accordance with an exemplary embodiment of the present invention.

FIG. 3 is a block diagram 300 that illustrates client 110 communicating with server 150 and server 160 in accordance with further exemplary embodiments of the present invention.

Like FIG. 2, client 110 is capable of communicating with server 150 outside of a VPN server. Again, as in the description of FIG. 2, domain name resolution is omitted from the present description.

Once client 110 transmits data, the data is transmitted to Internet 140 via ISP 130 and optional local area network 120. Data traveling outside of a VPN can then depart Internet 140 and be received by server 150. In response, data departs from server 150, is transmitted through Internet 140 (the ISP between server 150 and Internet 140 is not illustrated), and is transmitted to client 110 via ISP 130 and optional local area network 120.

In accordance with exemplary embodiments of the present invention, data transmission within a VPN bears similarity to the description provided with regard to FIG. 2. FIG. 3 differs from FIG. 2, however, in that VPN server 305 and ISC 310 are situated together (logically and/or physically). Thus, in contrast to FIG. 2 in which communication between VPN server 170 and ISC 210 is via the Internet 140, VPN server 305 and ISC 310 are able to communicate with each other outside of the Internet 140. In at least one embodiment, VPN server 305 and ISC 310 are able to communicate directly. The configuration illustrated in FIG. 3 provides communication between ISC 310 and VPN server 370 is not subject to delays that may occur as data is transmitted over Internet 140. Furthermore, in the exemplary configuration illustrated in FIG. 3, ISC 310 plays a role in routing data between client 110 and server 160.

In exemplary embodiments, data from client 110 is encapsulated by a VPN client (not illustrated). The encapsulated data then travels through optional local area network 120, ISP 130, Internet 140, and ISC 310 before reaching VPN server 305. VPN server 370 decapsulates the data and then sends the decapsulated data to server 160 via a path at least partially chosen by an ISP (not illustrated) associated with ISC 310, or permits ISC 310 to select the entry point for the decapsulated data to enter Internet 140 (and thus at least partially selects the path within Internet 140). After reaching server 160, the server 160 responds with data that is received by VPN server 305. VPN server 305 encapsulates the received data and then ISC 310 selects the entry point at which the encapsulated data enters Internet 140. The data travels from Internet 140, through ISP 130, through optional local area network 120 and to client 110 (the VPN client that encapsulates the data for client 110 is not illustrated).

Examples of how data is encapsulated in order to control its transmission to the various locations is illustrated in FIG. 6A, FIG. 6B, FIG. 7A, and FIG. 7B FIG. 4 is a flowchart diagram that illustrates the operation of an exemplary embodiment of the present invention. At operation 405, if not already done, the client device enables the VPN. At operation 415, the VPN directory server provides the client device ('client') with the IP address of the interconnect server center ISC.

At operation 420, client 110 attempts to transmit packets ("upload packets") to server 160 via the VPN. In order to perform this transmission, the data being transmitted will be encapsulated. Thus, the VPN client (not illustrated) operating as an agent application within client 110 encapsulates the data transmitted from client 110 and transmits the data to the ISC at the IP address received from the VPN directory server. Thus, in some exemplary embodiments, the client's ISP may play a role in how the data is channeled over Internet 140 to the ISC. In other embodiments, various operations are taken to improve the speed with which the data is transferred from client 110 to the ISC. Exemplary methods of improving speed include having the ISC use the same ISP as client 110, providing some direct route of communication between client 110 and interconnect server center 210, 310 (outside of the Internet), requesting ISP 130 to perform some type of dedicated pathway selection of data to ISC (although this option often may not be available), etc.

At operation 420, now that the VPN client has the IP address of ISC 210, the VPN client encapsulates the data ("upload data") from client 110 and transmits the upload data to ISC 210. The transmission of data to ISC 210 is typically performed over the Internet. At operation 425, ISC 210 receives the upload data and selects, at least in part, how the upload data will be transmitted over the Internet and toward server 160. Thus, at operation 425, ISC 210 selects the entry point of data to Internet 140. Choosing the entry point to Internet 140 may include the operations of choosing a Tier 1 provider, choosing a Tier 2 provider, choosing from among one or more physical entry points into the Internet 140 (via a Tier 1 provider or a Tier 2 provider), etc.

At operation 430, ISC 210 further encapsulates the data being transmitted with the address of VPN server 170, and then transmits the encapsulated data over the (at least partially) identified path of the Internet and towards VPN server 170. In one exemplary embodiment, the transmission of data to VPN server 170 includes information regarding the return path of data from server 160 to client 110. In other embodiments, VPN server 170 optionally already has the return path information at the time that ISC 210 transmits the data to VPN server 170.

At operation 435, VPN server 170 decapsulates the data and retransmits the data to server 160. When this transmission occurs at operation 435, server 160 is informed that the data has arrived from VPN server 170. In this manner, server 160 is able to transmit the reply to VPN server 170.

At operation 440, the data packets that had been transmitted by client 110 are received at server 160. Alternatively, at operation 445, VPN server 170 transmits data to ISC 210, which again selects at least part of the path over the Internet 140 for the data to be route, and then retransmits the data over Internet 140 to server 160.

Figure 5:
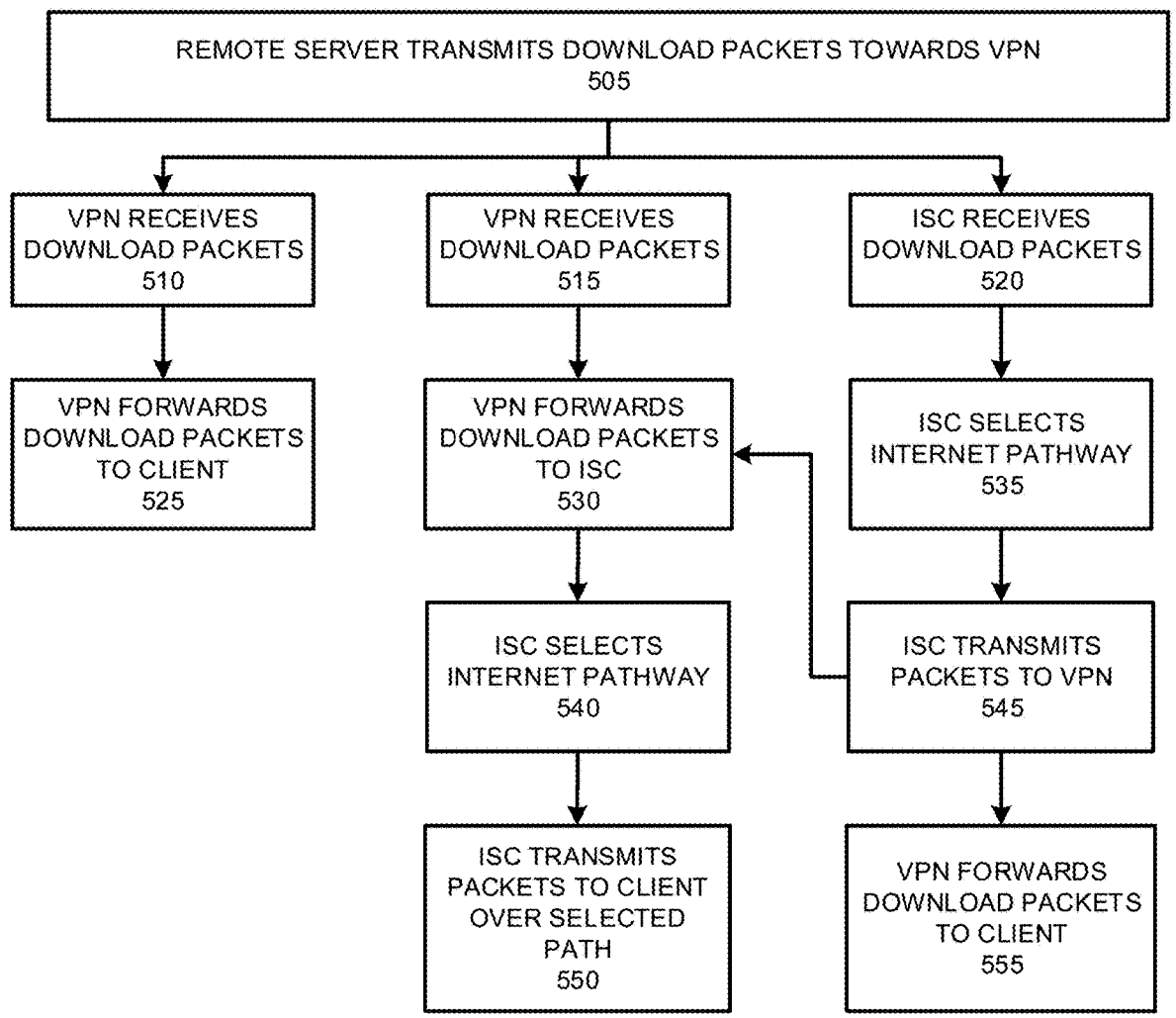
FIG. 5 is a flow chart diagram that illustrates a remote server communicating with a VPN server and a client via an ISC in accordance with an exemplary embodiment of the present invention.

FIG. 5 is a flowchart diagram that illustrates server 160 responding to the receipt of upload data, by transferring download data from server 160 to client 110.

At operation 505, server 160 (sometimes referred to in this explanation as the "target" server or "destination" server) transmits response data towards client 110. For purposes of this explanation, the packets being transmitted by server 160 to client 110 will be referred to as "download" packets or download data. After operation 505 is performed, various alternative operations may be performed. Each alternative operation will be described in turn.

For example, at operation 510, the download packets are transferred from server 160 to VPN server 170. The packets are delivered from server 160 to Internet 140 by whatever route is used by the ISP that is servicing server 160. At operation 525, VPN server 170 forwards the received download packets to client 110 by whatever pathways are decided by the respective ISPs.

Alternatively, for example, at operation 515, VPN server 170 receives the download packets from server 160. The packets may be transmitted to VPN server 170 via an ISP that is serving server 160. At operation 530, the packets are encapsulated and forwarded to ISC 210.

At operation 540, ISC 210 decapsulates the received packets, selects the Internet entry point (or Tier 1 ISP, or Tier 2 ISP, Tier 3 ISP or other connections and/or pathways). At operation 550, ISC 210 transmits the download packets to client 110 over the selected path. The VPN client within client 110 encapsulates the encapsulated download packets so that the packets transmitted from server 160 are now available to client 110.

Alternatively, for example, ISC 210 receives the download packets from server 160 (without VPN server 170 intercepting the packets) at operation 520.

At operation 535, ISC 210 selects the Internet entry point (or Tier 1 network, or Tier 2 network, or Tier 3 network, or physical connection, or other criteria).

At operation 545, ISC 210 transmits the download packets to VPN server 170 over the pathway (or partial pathway) selected at operation 535.

At operation 555, VPN server 170 encapsulates the download packets, and transmits the encapsulated download packets to the VPN client associated with client 110. The packets are decapsulated, and then the packets that had been transmitted from server 160 are now available to client 110.

In yet another embodiment, ISC 210 (or another interconnect service center) plays a role in the data being transferred from server 160 to VPN server 170 as well as a role in the data being transferred from VPN server 170 to client 110. In this alternative embodiment, after operation 545, the next operation proceeds to operation 530 instead of 555. The ISC is used to forward the packets by selecting an Internet pathway 540 and forwarding the packets 550.

FIG. 6A in FIG. 6B are exemplary embodiments that provide examples of how encapsulation may be performed in order to route data between source, destination, VPN server, and interconnect server center. As an example, in FIG. 6A the initial source of data for data packets sent from the client 110 and designated for a server may be client 110, and the initial destination of data may be server 160. Between the data exiting client 110 and being received by server 160, ISC 210 may be an intermediate destination, and then may become an intermediate source in order to forward data to VPN server 170 (which becomes an intermediate destination, and then upon retransmission to server 160 becomes an intermediate source).

In this example, client 110 sends data to server 160. Thus, FIG. 6A illustrates that client 110 transmits Payload 1 602 with a packet header that indicates client 110 as the data source field 606 and server 160 as the data destination field 604.

As a next operation, the packet destined for server 160 is encapsulated by the VPN client with a source IP address and the destination IP address that enables the encapsulated packet to be received by ISC 210. In the example, the added header field 614 illustrates the source is client 110 and the destination field 610 indicated ISC 210. The original source and destination headers are preserved.

In a subsequent operation, the encapsulated data packet is received by ISC 210, and then ISC 210 forwards the encapsulated data packet to VPN 170 via Internet routing as decided by ISC 210. As illustrated in FIG. 6A, the previously added header (client 110) field is removed from the source field of the data packet along with the ISC 210 as the destination field and a new header is added with a source IP address field 616 of ISC 210 and a destination IP address field 612 of VPN 170 and the original headers are still preserved. In this manner, the data packet may be transmitted to VPN 170. After VPN 170 receives the encapsulated data packet, the data packet is decapsulated, the added headers (ISC 210—source, and VPN 170—destination and client 110—destination) are removed, and the original header is modified by VPN 170 to indicate that the source of the packet is VPN 170 and the destination of the packet is server 160. In this manner, when server 160 receives the packet, server 160 believes that the packet originated from VPN 170. This example also has the original destination as always being preserved (i.e., server 160).

In another example of the present invention, the response from server 160 is transmitted to client 110 through ISC 210. As illustrated in FIG. 6B, server 160 transmits a different payload 'Payload 2' 622 with a header field 632 that indicates the source is server 160 and the destination field 624 is VPN 170. When VPN 170 receives the packet, VPN 170 replaces the destination field in the packet header with the destination address 626 of client 110, and encapsulates the packet so that the packet is transferred to ISC 210. Thus, in one embodiment, when VPN 170 receives the response from server 160, VPN 170 consults a routing table which functions similarly to a network address translator (NAT), and has pre-stored that the response from server 160, upon receipt by VPN 170, should be forwarded to client 110. That is why the destination field 624 is replaced with 626 to include the address of client 110. VPN 170 then encapsulates the packet that it receives with additional header fields 634/638. The additional header fields indicate that the source 638 is VPN 170 and the destination 634 is ISC 210. The packet is transmitted to ISC 210, and after ISC 210 receives the packet, ISC 210 deletes the additional header and instead encapsulates the received packet with a new header indicating that the source field 640 is ISC 210 and the destination 636 is client 110. ISC 210 subsequently inserts the packet into the Internet at a device and/or network tier of its own selecting. When the encapsulated packet is received by the VPN client 118 of client 110, the VPN client strips the outermost header so that client 110 receives 'Payload 2' with a header showing a source field 632 of server 160 and the destination field 628 of client 110. The destination address 626 may be client 110 or VPN 170 depending on whether the VPN is designated as the recipient. However, the source header 632 will consistently identify the server 160.

FIG. 7A and FIG. 7B illustrate alternative exemplary embodiments of the present invention. In FIG. 7A, client device 110 transmits 'Payload 3' 702 to server 160. Thus, the packet header indicates that the source field 706 is client device 110 and the destination 704 is server 160. The VPN client 118 encapsulates this packet with a new header that indicates a source field 712 of client 110 and a destination 710 of VPN 170. In this manner the encapsulated packet is transmitted to VPN 170. VPN server 170 decapsulates the received packet, and replaces the original packet header with a packet header showing a source IP address 708 of ISC 210 and the destination IP address of server 160. The packet is subsequently transmitted to server 160. The packet that is received by server 160 includes 'Payload 3' with a header that includes ISC 210 as the source field 708 and server 160 is the destination field 704.

In a further exemplary embodiment of the present invention, server 160 responds to the receipt of 'Payload 3' by transmitting 'Payload 4' 722 to client device 110 with source 732 identifying server 160 and destination 724 identifying ISC 210. ISC 210 receives the packet and encapsulates the packet by adding an additional header with a source IP address 736 of ISC 210 and a destination IP address 734 of VPN 170. The original header may optionally be modified to include a destination address 726 of client device 110. The encapsulated packet is then transmitted to VPN 170 via an insertion point on the Internet that is selected by ISC 210. The VPN 170 receives the encapsulated packet, decapsulates the received packet, optionally changes the destination header address 728 to client 110 (if not previously done) and makes available to client 110 'Payload 4' with the header field 732 that includes source IP address server 160 and destination IP address client 110.

In another example, the routing of the data to and from the client device 110 and the remote server may be performed based on one or more network routing criteria. Such decisions may include a quality of service of the available routes, including but not limited to a fewest amount network route decisions (hops), a level of bandwidth, a dedicated bandwidth, (Mbps), a public vs. private Internet route, a leased line vs. a shared line, etc. Such routing decisions may be performed by the VPN 170, the ISC 210, the ISP 130/165 or any combination thereof. In general, the ISC 210 is setup to identify the optimum route for data transfers based on various routing options which may be available, however, the ISC available routes may be unavailable or may require unexpected delays or costs. A particular route may be identified to have a certain amount of bandwidth, latency, or their network characteristics which can be used as the basis to select or not select that route. Also, the decision for routing may include using the VPN 170 but not using the ISC 210 due to unavailability of certain routes or quality of service (QoS) which are expected when routing the data.

In one example, if a news station is reporting in a remote location across the world from their headquarters, then the decision to route data back to their native location may include using a VPN, using a basic Internet service and/or a dedicated service. Some data may be important such as a live feed, while other data, such as images, emails, etc., may be less important and may be sent over a non-optimal route to save costs or other resources which could adversely impact the important data. Bypassing the ISC 210 to route data may be performed in cases where the VPN server is still used but there is more local traffic which is not high priority.

The connection parameters of the available links may be identified and examined for compliance and routing decisions, such as using the ISC 210 or bypassing the ISC. Another option may be identifying the type of application traffic (e.g., streaming data, domain name specific data, IP address specific data., etc.). In one example, streaming traffic, video or email data may be sent over different routes. One or more of those data types may be identified and sent over a public Internet connection. Other types of data may be optimally sent over a different dedicated type of route. The VPN server 170 may be the decision maker as to whether to route data over the ISC 210 or not, and whether to attempt a known ISC fast path route or to select a different route. The ISC 210 may be setup to identify a faster/more secure path if it is available.

Figure 8:
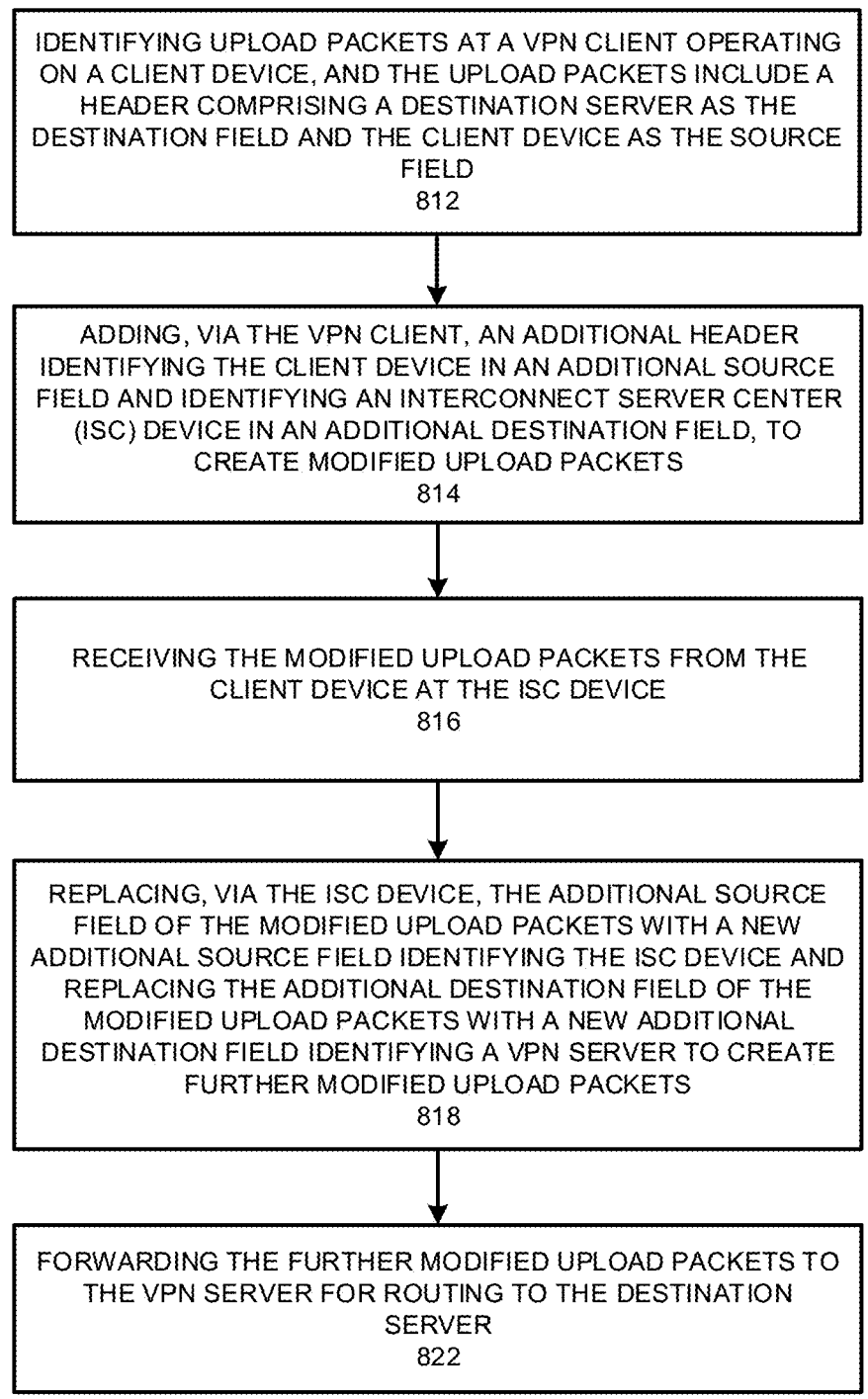
FIG. 8 is a flow diagram of an example method of operation according to exemplary embodiments of the present invention.

FIG. 8 is a flow diagram of an example method of operation according to exemplary embodiments of the present invention. Referring to FIG. 8, the example process may include identifying upload packets 812 at a VPN client operating on a client device, and the upload packets include a header with a destination server as the destination field and the client device as the source field. The process may also include adding 814, via the VPN client, an additional header identifying the client device in an additional source field and identifying an interconnect server center (ISC) device in an additional destination field, to create modified upload packets, receiving the modified upload packets 816 from the client device at the ISC device, replacing 818, via the ISC device, the additional source field of the modified upload packets with a new additional source field identifying the ISC device and replacing the additional destination field of the modified upload packets with a new additional destination field identifying a VPN server to create further modified upload packets. The process may also include forwarding the further modified upload packets 822 to the VPN server for routing to the destination server.

The process may also include removing, via the VPN server, the new additional source field, and the new additional destination field, and replacing the source field identifying the client device with a source field identifying the VPN server to create decapsulated upload packets, forwarding the decapsulated upload packets to the destination server.

Responsive to receiving the decapsulated upload packets at the destination server, the process may also include creating download packets including a header with the destination server as the source field and the VPN server as the destination field. The process may also include adding, via the VPN, an additional header identifying the VPN server as an additional source field, and identifying the ISC device as an additional destination field, to create modified download packets, and forwarding the modified download packets to the ISC, replacing, via the ISC device, the additional source field of the modified download packets with a new additional source field identifying the ISC device, and replacing the additional destination field of the modified download packets with a new additional destination field identifying the client device to create further modified download packets, and forwarding the further modified download packets to the VPN client of the client device. The process may also include removing, via the VPN client, the new additional source field and the new additional destination field. The process may also include selecting via the ISC device a pathway for transmitting the upload packets to the destination server based on one or more of a data application type associated with the upload packets and one or more identified network characteristics including one or more of jitter, latency and error rate of the available network routes. The data application type includes one or more of voice, video, and time dependent interactive content. The process may also include selecting via the client device a pathway for transmitting the upload packets to the destination server based on one or more available network routes and one or more identified network characteristics, and the pathway is a bypass omitting the ISC device. The selected pathway is used to transmit lower priority data to the destination server. The lower priority data is data that is generally not voice, video, and other time dependent interactive content. The network characteristics include one or more of jitter, latency and error rate of the available network routes.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Figure 9:
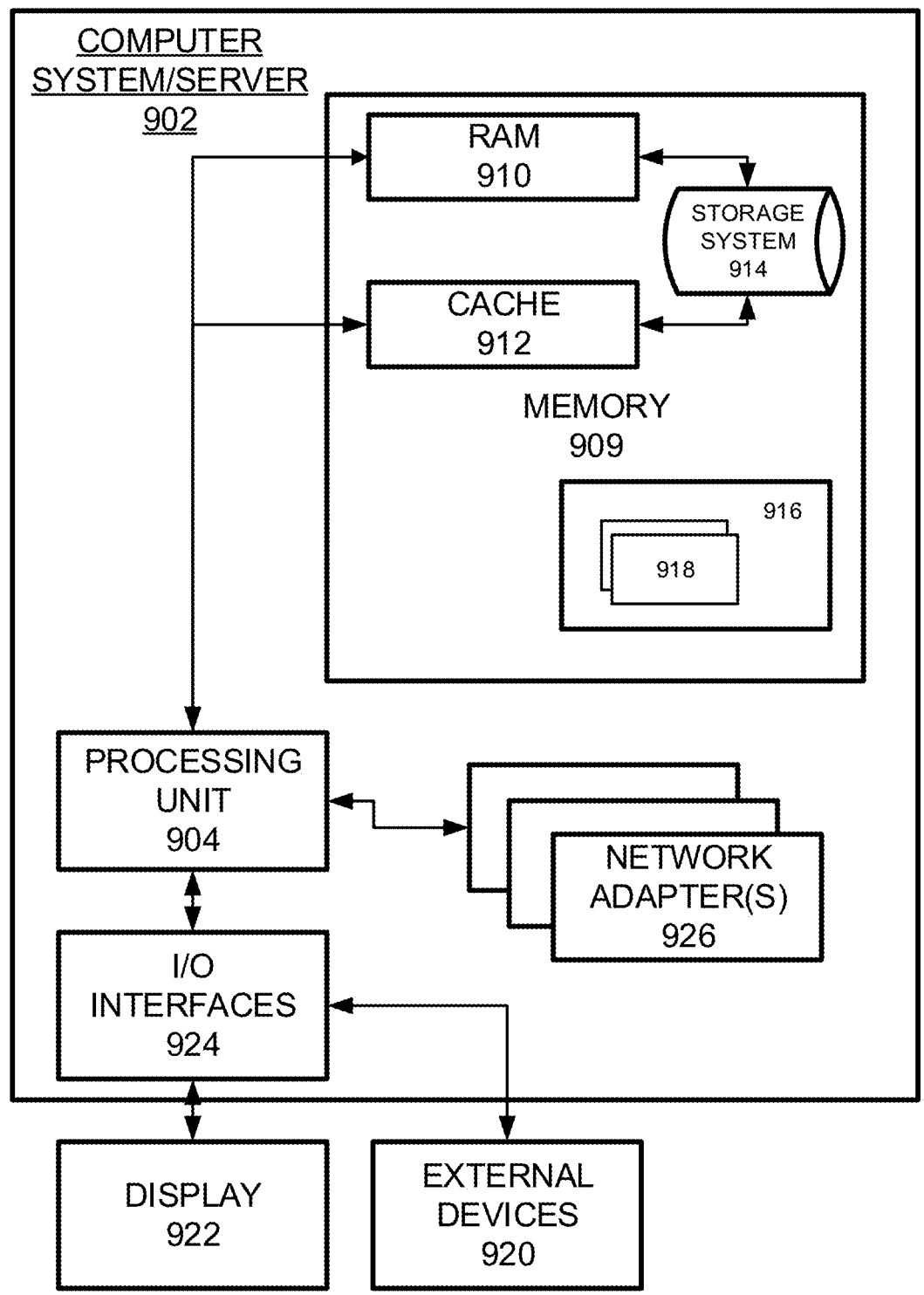
FIG. 9 is a computer readable medium and corresponding system configuration of an example device(s) configured to perform one or more operations associated with exemplary embodiments of the present invention.

FIG. 9 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 9 illustrates an example network entity device configured to store instructions, software, and corresponding hardware for executing the same according to example embodiments. FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 9, computer system/server 902 in cloud computing node 900 is displayed in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter(s) 926. As depicted, network adapter(s) 926 communicates with the other components of computer system/server 902 via a bus. It should be understood that although not displayed, other hardware and/or software components could be used in conjunction with computer system/server 902. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are illustrated in block diagram form, rather than in detail, in order to avoid obscuring the disclosure.

The disclosure is related to an apparatus for performing the operations herein. This apparatus may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation illustrated and described by way of illustration is in no way intended to be considered limiting. Therefore, references to details of various implementations are not intended to limit the scope of the claims, which in themselves recite only those features regarded as the disclosure.

The invention claimed is:

1. A method comprising:
receiving upload packets, at an interconnect server center (ISC) device from a virtual private network (VPN) client device, wherein the upload packets comprise a header identifying the (ISC) device as a destination field and a destination server as an additional destination field;
replacing, via the ISC device, a source field of the upload packets with an additional source field identifying the ISC device;
transmitting, via the ISC device, tests packets along a plurality of different Internet pathways to identify network characteristics of the Internet pathways;
determining an amount of time until one or more responses to the test packets are received; and
forwarding the upload packets to a VPN server for routing to the destination server via an Internet pathway selected based on the amount of time associated with the received test packets.

2. The method of claim 1, comprising
replacing, via the ISC device a destination field of the upload packets with a new destination field identifying the VPN server to create modified upload packets.

3. The method of claim 2, comprising
removing, via the VPN server, the source field, and the destination field; and
replacing the source field identifying the client device with a source field identifying the VPN server to create decapsulated upload packets.

4. The method of claim 3, comprising
forwarding the decapsulated upload packets to the destination server.

5. The method of claim 4, comprising
responsive to receiving the decapsulated upload packets at the destination server, creating download packets including a header comprising the destination server as the source field and the VPN server as the destination field.

6. The method of claim 5, comprising
adding an additional header identifying the VPN server as an additional source field, and identifying the ISC device as an additional destination field, to create modified download packets; and
forwarding the modified download packets to the ISC.

7. The method of claim 6, comprising
replacing, via the ISC device, the additional source field of the modified download packets with a new additional source field identifying the ISC device, and replacing the additional destination field of the modified download packets with a new additional destination field identifying the client device to create further modified download packets; and forwarding the further modified download packets to the VPN client of the client device.

8. The method of claim 7, comprising
removing, via the VPN client, the new additional source field and the new additional destination field.

9. The method of claim 1, wherein the network characteristics comprise one or more of jitter, latency and error rate of the available network routes.

10. A system comprising:
a virtual private network (VPN) a client device; and
an interconnect server center (ISC) device configured to
receive upload packets from the virtual private network (VPN) client device, wherein the upload packets comprise a header identifying the (ISC) device as a destination field and a destination server as an additional destination field;
replace, via the ISC device, a source field of the upload packets with an additional source field identifying the ISC device;
transmit tests packets along a plurality of different Internet pathways to identify network characteristics of the Internet pathways;
determine an amount of time until one or more responses to the test packets are received; and
forward the upload packets to a VPN server for routing to the destination server via an Internet pathway selected based on the amount of time associated with the received test packets.

11. The system of claim 10, wherein the ISC device is further configured to replace a destination field of the upload packets with a new destination field identifying the VPN server to create modified upload packets.

12. The system of claim 11, wherein the VPN server is configured to remove the source field and the destination field, and replace the source field identifying the client device with a source field identifying the VPN server to create decapsulated upload packets.

13. The system of claim 12, wherein the decapsulated upload packets are forwarded to the destination server.

14. The system of claim 13, wherein responsive to receiving the decapsulated upload packets at the destination server, download packets are created including a header comprising the destination server as the source field and the VPN server as the destination field.

15. The system of claim 14, wherein the VPN server is further configured to
add an additional header identifying the VPN server as an additional source field, and identifying the ISC device as an additional destination field, to create modified download packets; and
forward the modified download packets to the ISC.

16. The system of claim 15, wherein the ISC device is further configured to replace the additional source field of the modified download packets with a new additional source field identifying the ISC device, and replace the additional destination field of the modified download packets with a new additional destination field identifying the client device to create further modified download packets, and forward the further modified download packets to the VPN client of the client device.

17. The system of claim 16, wherein the VPN client device is configured to remove the new additional source field and the new additional destination field.

18. The system of claim 10, wherein the network characteristics comprise one or more of jitter, latency and error rate of the available network routes.

19. A non-transitory computer readable storage medium configured to store instructions that when executed cause a processor to perform:
receiving upload packets, at an interconnect server center (ISC) device from a virtual private network (VPN) client device, wherein the upload packets comprise a header identifying the (ISC) device as a destination field and a destination server as an additional destination field;
replacing, via the ISC device, a source field of the upload packets with an additional source field identifying the ISC device;
transmitting, via the ISC device, tests packets along a plurality of different Internet pathways to identify network characteristics of the Internet pathways;
determining an amount of time until one or more responses to the test packets are received; and
forwarding the upload packets to a VPN server for routing to the destination server via an Internet pathway selected based on the amount of time associated with the received test packets.

20. The non-transitory computer readable storage medium of claim 19, wherein the processor is further configured to perform:
replacing, via the ISC device, a destination field of the upload packets with a new destination field identifying the VPN server to create modified upload packets.

* * * * *